United States Patent
Gal et al.

(10) Patent No.: US 10,904,205 B2
(45) Date of Patent: *Jan. 26, 2021

(54) CONTENT DELIVERY NETWORK OPTIMIZATION SYSTEM

(71) Applicant: salesforce.com, inc., San Francisco, CA (US)

(72) Inventors: Shauli Gal, Mountain View, CA (US); Satish Raghunath, Sunnyvale, CA (US); Kartikeya Chandrayana, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,562

(22) Filed: Jan. 31, 2020

(65) Prior Publication Data

US 2020/0177541 A1    Jun. 4, 2020

Related U.S. Application Data

(63) Continuation of application No. 15/469,419, filed on Mar. 24, 2017, now Pat. No. 10,567,332.

(51) Int. Cl.
*H04L 29/12* (2006.01)
*H04L 29/08* (2006.01)
*H04L 12/26* (2006.01)

(52) U.S. Cl.
CPC .......... *H04L 61/1511* (2013.01); *H04L 67/32* (2013.01); *H04L 43/0864* (2013.01); *H04L 67/2885* (2013.01)

(58) Field of Classification Search
CPC ... H04L 61/151; H04L 67/32; H04L 67/2885; H04L 43/086
See application file for complete search history.

(56) References Cited

U.S. PATENT DOCUMENTS

| | | | |
|---|---|---|---|
| 9,634,992 B1* | 4/2017 | Rostamabadi | G06F 16/9535 |
| 10,412,186 B2* | 9/2019 | Newton | H04L 67/2842 |
| 2008/0229025 A1* | 9/2008 | Plamondon | H04L 67/28 |
| | | | 711/126 |
| 2010/0257258 A1* | 10/2010 | Liu | H04L 61/6009 |
| | | | 709/220 |
| 2014/0149552 A1* | 5/2014 | Carney | H04L 67/32 |
| | | | 709/219 |
| 2018/0278688 A1 | 9/2018 | Gal et al. | |

OTHER PUBLICATIONS

U.S. Appl. No. 15/469,419, Non-Final Office Action dated Mar. 22, 2019.
U.S. Appl. No. 15/469,419, Notice of Allowance dated Oct. 7, 2019.

* cited by examiner

*Primary Examiner* — Todd L Barker
(74) *Attorney, Agent, or Firm* — Wong & Rees LLP; Kirk D. Wong

(57) ABSTRACT

A CDN traffic is optimized by a client-side system that maps the servers in the CDN system. Content requests from client devices for domain names are forwarded to servers in the CDN system that may be selected from the map to prevent a cache miss in the a server for a particular request for content.

15 Claims, 4 Drawing Sheets

CONTENT DELIVERY NETWORK OPTIMIZATION SYSTEM

CROSS-REFERENCE TO RELATED APPLICATIONS

This application is a Continuation of U.S. patent application Ser. No. 15/469,419 filed on Mar. 24, 2017, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to analysis of network performance data, and in particular, to domain name server (DNS) steering.

BACKGROUND

The Internet has enabled information providers to easily provide multimedia information to users across the world. The amount of available information has increased exponentially in the time that the Internet has been accessible to the public.

As more and more users accessed large multimedia files from information providers, such as music and movies, the information providers' servers became overloaded. The bottleneck became the bandwidth that the servers could handle. Content Delivery Network (CDN) providers began placing caching servers across the Internet at geographic locations that served content to users in specific geographic regions. The caching servers contained mirror images of the information providers' multimedia files. This eased the burden on the information providers' servers by offloading the user requests to the caching servers. Replicating the information providers' multimedia files across the caching servers required a large amount of storage for infrequently accessed multimedia files. The number of files that are accessed within an information provider's collection of multimedia files is low in comparison to the total number of files in the collection.

CDN providers changed the role of the caching servers by only caching content that was recently accessed on the caching servers. When a cache miss occurred (where a requested multimedia file was not cached in the caching server's memory), the caching server would request the multimedia file from a content provider's server. This causes a delay in the response time for the caching server.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
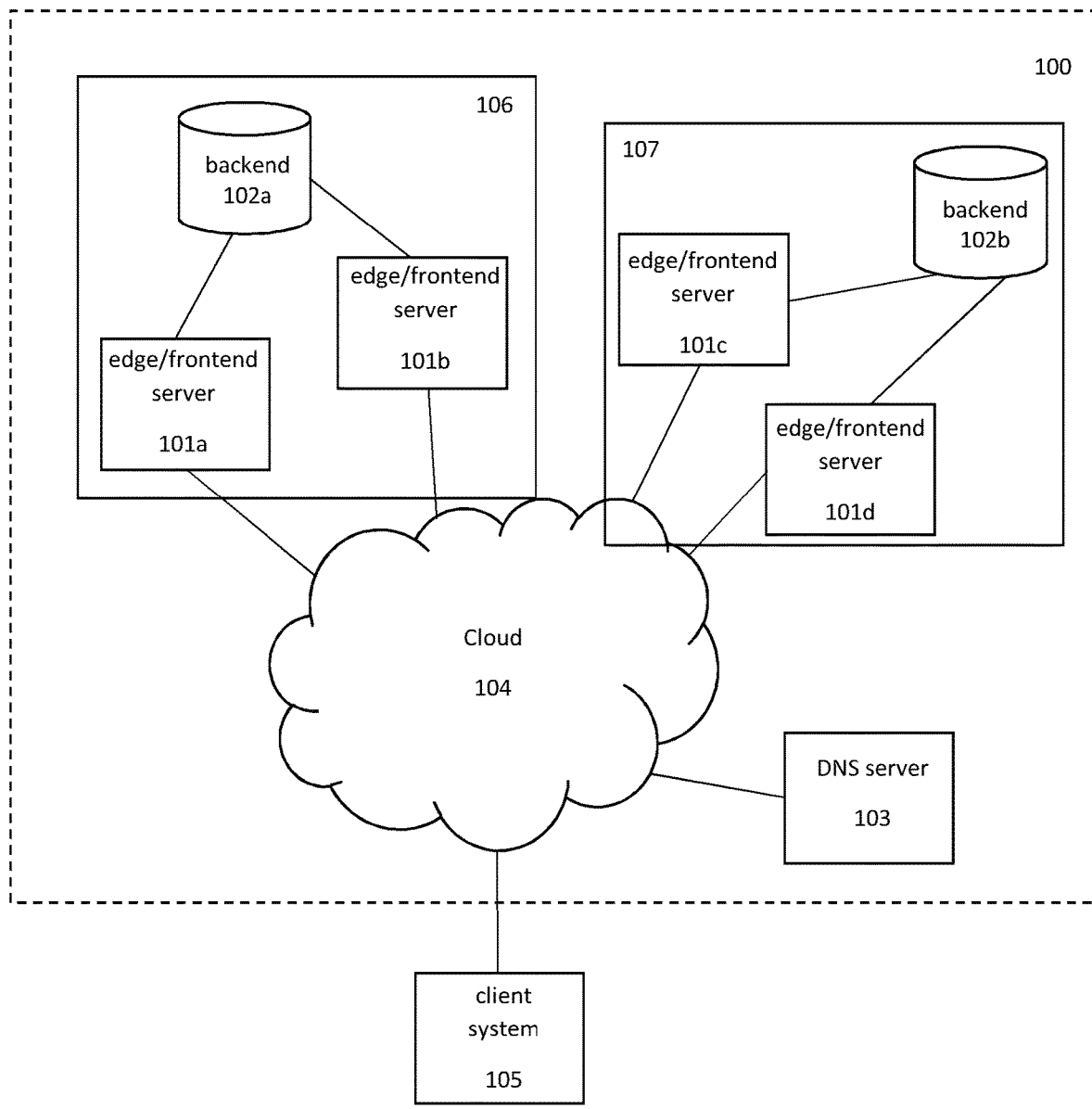
FIG. 1 illustrates a CDN system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
    1.0. General Overview
    2.0. Functional Overview
        2.1. CDN Optimizing
        2.2. Caching Groups
        2.3. Measuring Cache-Hit Ratio
        2.4. Improving Caching Ratio
        2.5. Heuristics to Discover Servers
        2.6. Obtaining Domain Names in HTTPS
        2.7. Measuring Cache-Hit Ratio
    3.0. Implementation Mechanism—Hardware Overview
    4.0. Extensions and Alternatives 1.0 General Overview This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Response times between a client and a server are generally dictated by the geographic distance or number of hops between the client and the server in the cloud, or Internet. There are other factors involved such as network connection or equipment quality, but the geographic distance was the major factor in creating Content Delivery Networks (CDNs). CDNs were created in a way that allowed the CDN providers to distribute their caching servers across the country so that network latencies were reduced for each geographic partition of the country. Edge servers were introduced that were placed on the outer boundaries, or edges, of the network across the country, residing in clusters of servers at each point of presence (PoP) location. These edge servers would cache multimedia content (e.g., video files, text files, image files, audio files, binary files, etc.) and respond to client content requests.

The traffic managers in the CDN system are Domain Name System (DNS) servers. DNS servers are responsible (authoritative) for a set of edge servers (which may equate to a geographical area or region). Client domain name IP address requests are routed to a DNS server that decides which edge servers are appropriate to serve the client request. The DNS server is in contact with the edge servers that the DNS server is responsible for and may know the operational status of the edge servers (e.g., alive, CPU load, etc.) for load balancing purposes, but typically does not know what content is cached on each edge server. Client domain name IP address requests are sent to DNS servers to determine what the machine IP addresses are associated with a given domain name. The clients require the correct IP address in order to route their multimedia content request to the proper content source. When a client domain name IP address request arrives at the DNS server, the DNS server reviews the states of the edge servers and the location of the client to decide which edge server the client will be routed to. DNS servers can perform load balancing among the edge servers by returning different IP addresses for certain domain names and can also return IP addresses that are close to an end user in terms of latency.

For example, assume three IP addresses 1.1.1.1, 1.1.1.2 and 1.1.1.3 are valid IP addresses for domain1. When a DNS server receives a request for the IP address of domain1, it could return 1.1.1.1 for the first request, 1.1.1.2 request for the second request, etc. This would cause requests for domain1 to be distributed among the three IP addresses and among three edge servers, if each IP address represents a different edge server.

The DNS server has access to information about the load on the three edge servers, it can return IP addresses based on machine load to perform load balancing intelligently. The DNS server also has access to information about the latency between various points on the network, so it can determine which IP address to return based on the latency between the edge server with that IP address and the client machine where the request came from.

Typically, an edge server maintains a dynamic number of popular files in its memory for a domain name. The number of files is determined by the fixed amount of memory that the edge server reserves for the customer. The files are typically ranked from most popular to least popular (among the stored files). The edge server records each time a file is requested.

An edge server receives a client's request for the multimedia content file. If the edge server has the requested content stored on its local storage (cache hit), it sends the file to the user. If the content is not in the edge server's stored files (cache miss), then the edge server can either request the content from a content (or origin) server or redirect the client to a content server that should have the content stored locally. The first approach is typically used in CDN systems. A cache miss introduces delay into the response time for a client device. Retrieving the content file from a content server and storing the file locally takes time. The delay becomes worse when there is a lag between the edge server and the content server.

The entire operation is transparent to the client system. A DNS server may direct two clients to different locations for the same multimedia content file because of load balancing or internal business reasons. If both requests result in cache misses at the respective edge servers, then the CDN system has introduced delays by making inefficient decisions.

An embodiment makes client-side requests more efficient regardless of the CDN provider's load balancing procedures or internal business reasons. A CDN optimizer server is introduced on the client side that acts as a proxy server for content requests. The CDN optimizer forwards content requests received from client systems to the CDN system. In an embodiment, the CDN optimizer does not receive IP address requests, but instead, receives out-of-band route requests that contain a domain name that informs the CDN optimizer server that there will be subsequent content requests routed to the domain name. The CDN optimizer server may send its own DNS request to the DNS server to resolve the domain name.

The CDN optimizer records the IP address responses received from the DNS server and correlates the IP addresses with the associated domain names. Embodiments of the CDN optimizer can use the correlated information to map domain names to one or more edge servers to ensure that cache misses are minimized.

The CDN optimizer determines which IP address to return to the client system so the client system sends the multimedia content request to the proper edge server. This ensures a more consistent response time on the client-side for repeat domain name accesses, thereby improving the overall performance of the client-side systems by using the CDN system's resources in a more efficient manner that is centered on the client-side's performance needs, rather than attempting to share the CDN system's resources with other parties in an unpredictable manner.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview 2.1 CDN Optimizing

In order to obtain optimal latency when consuming static content from the cloud, the ideal situation is for the CDN system to direct the client system to the nearest possible edge server. This implies that the desired content is resident in the cache of the nearest edge server. CDNs are designed to distribute copies of the content among many points of presence around the globe. Unfortunately, not all of the content can be cached everywhere due to practical limitations of the caching hardware. This means that the DNS server may direct a client system to the nearest edge server and the edge server does not have the content stored locally. The DNS server typically does not know what content is stored at an edge server. The DNS server does not know what the client system's desired content is because the name resolution is based on the domain name alone and not the file name Users see cache misses as poor response performance. The CDN Optimizer enhances the user experience by lowering the ratio of cache misses.

Referring to FIG. 1, the CDN system uses DNS to expose its edge (frontend) servers to the world. In this example, edge servers 101a, 101b, are located in the same edge PoP 106 and share their state in the backend storage 102a with each other. Edge servers 101c, 101d, are located in another edge PoP 107 and also share their state in backend storage 102b with each other. The states in backend storage 102 may include content files that the edge servers share. Note that some CDN systems may not have edge servers sharing their state. In that case, each edge server is considered independently.

When the DNS server 103 receives an IP address request for name resolution from a client device 105, the DNS server 103 narrows down its edge server list using server availability information and geographical distance between the client device and servers (e.g., which can be obtained using GeoIP). In this example, all edge four servers 101a-d are selected by the DNS server 103 for the preferred list. Also, in this example, edge servers 101a and 101b share content files C1 and C2 in backend storage 102a and edge servers 101c and 101d share content files C1 and C3 in backend storage 102b. If the client device 105 happens to be looking for content file C1, which is hosted in both backend storage 102a and 102b, then it does not matter which edge server is selected. However, if the desired content file is C2 or C3, then selecting the wrong edge server leads to a cache miss. Based on this example, consider the following scenario: a client device A experiences a cache miss when fetching content file C4 from edge server 101a. A minute later, another client device B also experiences a cache miss when fetching the same content file C4 from edge server 101c. The second miss could have been avoided by routing both users to the same edge server or any edge servers that have a shared backend storage.

Figure 2:
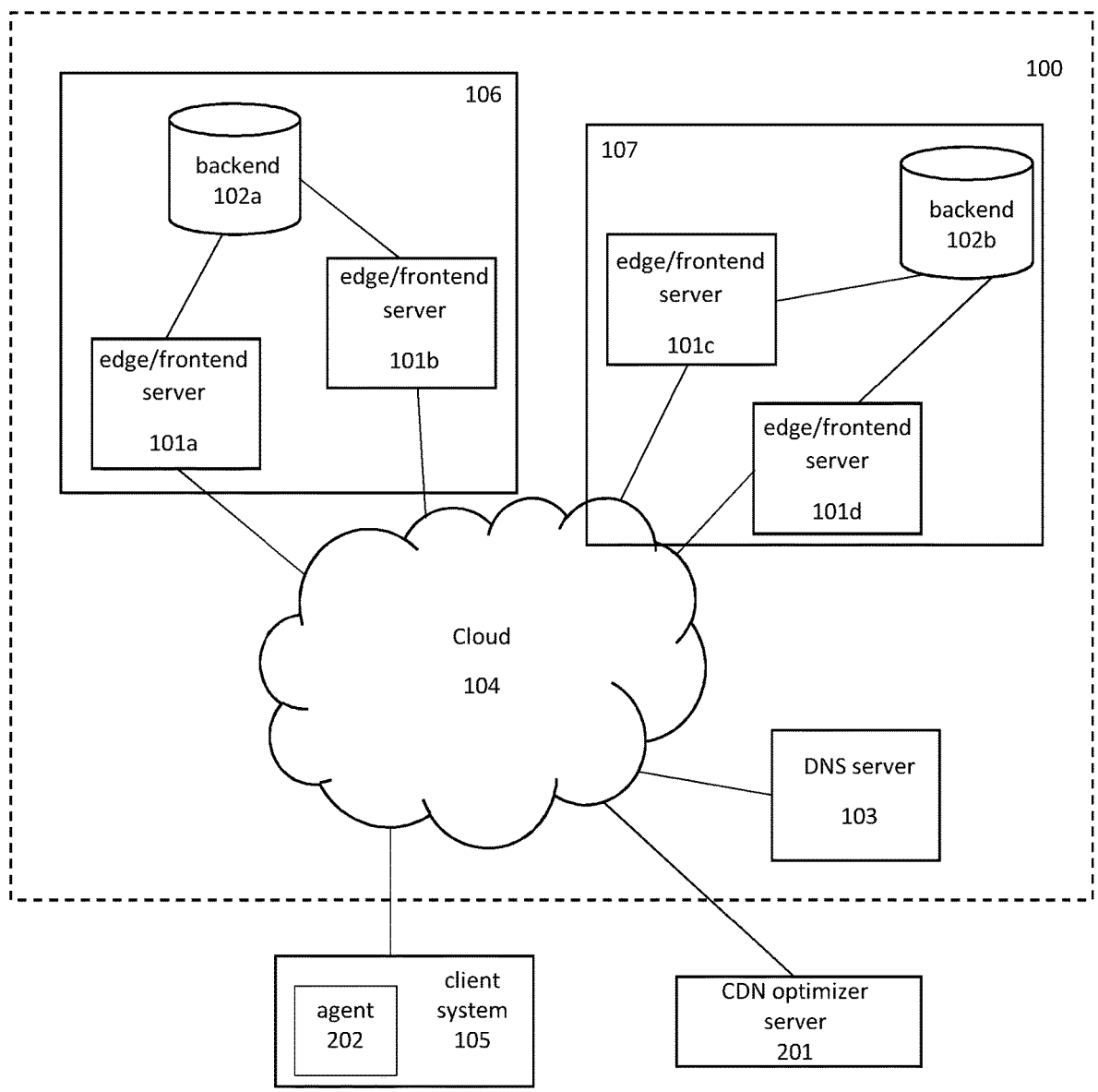
FIG. 2 illustrates a CDN system with a client-side CDN optimizing system, according to an embodiment of the invention.

Referring to FIG. 2, an embodiment includes two base components: a client side agent 201 which is embedded in the client device's application (e.g., via an SDK), and a CDN optimizer server 202. The CDN optimizer server 202 can be located in the cloud, at a customer site, etc., and communicatively connected to client side agents via the Internet, intranet, etc. Note that a single instance of the client side agent and the CDN optimizer server is shown in FIG. 2, but there can be more than one instance of either component in an implementation.

In an embodiment, the client device 105 offloads domain resolutions to the CDN optimizer server 202. Client devices do not interact directly with the different edge servers, but rather go through the CDN optimizer server for every request they have, no matter what the domain. The CDN optimizer server 202 uses DNS and heuristics to discover edge servers 101a-d. IP addresses of the edge servers are obtained as the client agents forward the IP address name resolution requests to the CDN optimizer server 202. In an embodiment, client agents may send a route request containing a domain name instead of the IP address name resolution requests that inform the CDN optimizer server 202 that subsequent content requests will be routed to that domain name. The CDN optimizer server 202 may send an IP address name resolution request of its own if it does not have the domain name in its cache. The CDN optimizer server 202 stores the edge server addresses in its cache until they expire and associates them with the domain names. Using a local cache of name-to-address mappings is also a faster approach than the standard client-side resolution. This is because every consecutive client device is reusing the mapping already found by the first client device.

Figure 3:
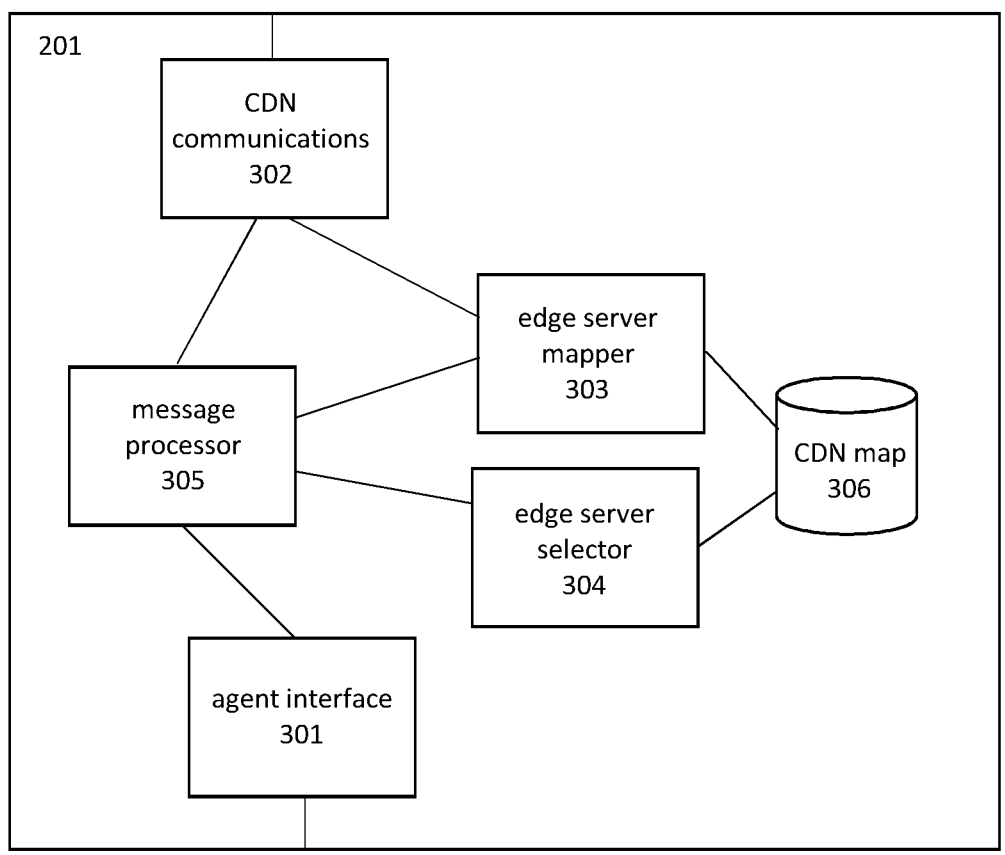
FIG. 3 illustrates a CDN optimizer server structure, according to an embodiment of the invention.

Referring to FIG. 3, the CDN optimizer server 201 communicates with agents, such as agent 202, via agent interface 301. Agent interface 301 receives requests (e.g., DNS name resolution requests, content requests, route requests etc.) from the agents and sends responses to the agents. Agent interface 301 forwards incoming agent requests to message processor 305.

Upon receiving a request for an IP address for a domain name from agent 202, agent interface 301 forwards the request to message processor 305. Message processor 305 communicates with edge server selector 304 to discover whether the CDN system has been mapped out and an edge server can be specified from the CDN map 306 for that domain name or that the IP address request is to be sent to the DNS server 103. If the request is to be sent to the DNS server 103, then the message processor forwards the request to CDN communications 302 and notifies edge server mapper 303 the domain name that the request is associated with.

In an embodiment, agent interface 301 may receive an out-of-band route request for a domain name from agent 202, agent interface 301 forwards the request to message processor 305. The route request informs the message processor 305 that there will be subsequent content requests that will be routed to that domain name Message processor 305 communicates with edge server selector 304 to discover whether the CDN system has been mapped out and an edge server can be specified from the CDN map 306 for that domain name or that an IP address request is to be sent to the DNS server 103. If the request is to be sent to the DNS server 103, then the message processor creates its own request, forwards the request to CDN communications 302, and notifies edge server mapper 303 the domain name that the request is associated with. An out-of-band protocol is described in U.S. patent application Ser. No. 14/970,510, entitled "Network Traffic Accelerator", filed on 15 Dec. 2015, and which is hereby incorporated by reference in its entirety for all purposes.

If edge server selector 304 responds to message processor 305 with an IP address of an edge server, then message processor can respond to the agent 202 with the IP address of the edge server via agent interface 301. Agent 202 may forward the response to the application that the agent 202 is associated with so the application can cause a session to be opened with that IP address. In an embodiment, if the agent 202 has sent a route request, then the message processor 305 does not need to respond to the agent 202 and knows that the domain name is present in the CDN map 306. In some cases, a content request may accompany the route request and the message processor 305 forwards the content request to the IP address of the edge server. All communications between the application and the edge server are sent through the CDN optimizer server 201 where the CDN optimizer server 201 serves as a proxy for the communications. The communications flow through the agent interface 301, message processor 305, and CDN communications 302.

Responses to IP address requests from DNS server 103 are received by CDN communications 302. The responses are forwarded to message processor 305. Message processor 305 passes the IP address to edge server mapper 303 which consolidates the IP address with the associated domain name and records the name/address pair in CDN map 306. CDN map 306 may include name/address pairs as well as latency information and other information as discussed below. CDN map 306 may be organized and accessed using techniques described below. IP addresses may have an associated expiration time or limited lifetime, which, when reached, cause edge server mapper 303 to remove the IP address from CDN map 306. This ensures that the list of edge servers is periodically refreshed and new edge servers or edge servers that have gone offline are found. In an embodiment, the CDN map 306 may be preloaded by an administrator and may be designated as static or may be dynamically updated by edge server mapper 303.

Upon receiving a content request destined for a domain name from agent 202, agent interface 301 forwards the request to message processor 305. Message processor 305 communicates with edge server selector 304 to retrieve an IP address from the CDN map 306. Edge selector 304 returns an IP address for an edge server to message processor 305. Message processor 305 forwards the content request to the IP address via CDN communications 302. In an embodiment, responses from edge servers are sent directly to the requesting client devices. In another embodiment, CDN optimizer server 201 can forward responses from edge servers to the appropriate client devices.

When edge server selector 304 receives a query for an IP address that is associated with the domain name from message processor 305, edge server selector 304 performs a lookup into CDN map 306 for any IP addresses associated with the domain name. If there are no associated IP addresses or the edge server mapper 303 has not determined that the CDN map for that domain name is not sufficient, then the edge server selector informs the message processor 305 that no IP address is available.

If edge server selector 304 determines that one or more IP addresses are associated with the domain name, then it dynamically calculates a preferred edge server set for the domain name using information stored in the CDN map 306, e.g., as detailed below. It then selects one IP address, using techniques discussed below, from the preferred edge server set as the designated edge server and returns the IP address of that server to message processor 305.

Edge server selector 304 may also perform traffic load balancing across two or more edge servers in an effort to not overburden one or more edge servers. The load balancing efforts are in relation to the traffic that the message processor 305 detects for each edge server as requests from agents are passed through the CDN optimizer server 201 to the edge servers. This does not take into account traffic from other users' client devices that share the CDN system's resources because the CDN optimizer server 201 cannot see that traffic.

The CDN system may attempt to direct traffic to certain edge servers as traffic across its edge servers varies during the day. The CDN optimizer server 201 can track the CDN system's patterns by recording the number of times each IP address of the edge servers are returned by the DNS server 103. Even though the edge server mapper 303 has reached the point where it has sufficiently mapped the CDN system's edge servers for certain domain names, the system can continue to send IP address requests to the DNS server 103 when it receives such requests from the agents. The edge server mapper 303 then records the number of times each edge server IP address is returned from the DNS server 103. This approach allows edge server selector 304 to give some deference to the CDN system's load balancing attempts when edge server selector 304 selects an edge server for a domain name. The edge server selector 304 could infer that the edge server with a higher reference count is preferred by the CDN system.

CDN communications 302 may also detect that an edge server fails to respond to a request sent to an edge server. It can notify edge server mapper 303 that a failure has occurred and the edge server mapper 303 can note in CDN map 306 that the edge server is non-responsive or it can remove the IP address from the CDN map 306.

2.2 Caching Groups

Most CDN systems have a layered delivery schema. These types of systems organize their edge hardware resources in a way that attempts to optimize the amortized latency, where: the most popular content is quickly fetched from local memory, less popular content is fetched from disk, and the least popular content is fetched from the network (e.g., from an origin server, content provider, etc.). In some CDN systems, the edge servers located in the same edge PoP might be sharing their state. This means that no matter which edge server in the PoP is approached for content they would all respond with similar latency. From the perspective of the edge server selector 304 optimizing the caching ratio, it is very useful to know if two or more edge servers are sharing state or not.

2.3 Measuring Cache-Hit Ratio

As an end user, it is often possible to tell if the delivered content was a cache miss or cache hit. Most CDN systems provide this information in the HTTP Response headers. By parsing the relevant header (e.g., "XCache"), the CDN system's actual "caching ratio" can be calculated. The edge server mapper 303 can track the caching ratio and the edge server selector 304 can optimize the original routing of the requests and use the caching ratio (along with the network latency) as a measure for the optimization effectiveness.

2.4 Improving Caching Ratio

The CDN optimizer server 202 can take the following approaches to improve the caching ratio:

1. Stateful hashing: Create a hash table in CDN map 306 that maps every object name to a certain edge PoP in the CDN system. This would make consecutive requests for the same object land on the same cache.

2. Stateless hashing: Use a deterministic hashing function to map every object name in the CDN map 306 to a certain edge in the CDN system. This approach is better in terms of memory requirements, but it might be suboptimal in terms of load balancing.

3. Static: CDN map 306 maps the whole domain to a small set of edges in the CDN system. The set should be large enough to handle the load of requests. The more "focused" requests are, the higher caching ratio can be obtained. For example, if there are five edges in a short list, then the probability of two client devices landing on the same cache is 0.2, but if there are four edges then the probability goes up to 0.25.

2.5 Heuristics to Discover Servers

The edge server selector 304 can combine any of the following three pieces of information to calculate a candidate list of edge servers:

a) Client side performance: The measured end-to-end latency of retrieving objects from a particular edge server needs to be as low as possible. Agents can measure this at the client device and inform the CDN optimizer server 201 of the measurements.

b) Roundtrip access latency: The physical transport latency from the CDN optimizer server 202 to the edge server needs to be as low as possible. This may be discovered via active measurement probes sent by CDN communications 302. Edge server mapper 303 may record the measurements in CDN map 306.

c) DNS results: The preferred edge servers as provided by the DNS server 103 can be reconciled with the other heuristics. This gives some deference to the DNS server's policies.

2.6 Obtaining Domain Names in HTTPS

The CDN optimizer server 201 is a transparent proxy that does not require any termination of the traffic. However, rerouting the requests at the CDN optimizer server 201 requires knowing the URL domain, even when the entire request is encrypted (HTTPS). The client agent has access to the clear version of the request. The domain could be conveyed by the agent to the CDN optimizer server 201 in the clear without having any privacy issues in one of two ways:

1. Out-of-band: A separate "control channel" could be used to indicate, for example, that "the HTTPS connection going on port X is actually destined to the domain Y".

2. In-band: A framing layer added between TCP and TLS may be used to "decorate" the HTTPS stream with additional information like the domain name. The client side tunnels the HTTPS and the CDN optimizer server 201 de-tunnels it, so the origin/CDN stays unchanged.

As the CDN optimizer server 201 has no access to the full content name, it cannot implement the "Stateful hashing" or "Stateless hashing" approaches discussed earlier. However, the agent knows the content name, so it can hash it and send the hashing output to the CDN optimizer server 201 along with the domain name. This information could be mapped in the CDN map 306 by the edge server mapper 303 to a specific edge PoP or edge server.

2.7 Hashing Function

The hashing function could be implemented in several ways:

1. Hashing the entire URL path: This is preferable when there is a reasonable number of times when the identical URL path is requested.
2. Hashing a part of the URL path with pure client-side logic: There can be heuristics in the agent that picks part of the URL path to compute the hash. This can be useful in cases where there are API requests and parts of the path have variable parameters.
3. Hashing with server-side hints: There can be a hint sent by the CDN optimizer server 201 to the agent on what parts of the URL need to be considered for the hash.

The following are examples of hashing scenarios:

1. Upon Setup:
   The CDN optimizer server 201 has a preconfigured mapping in CDN map 306 of domain X to a set of edges, where each edge has a unique number in the range [0 . . . SZ-1].
   The user opens an application on client system 105 that uses domain X for content delivery.
   The agent 202 uses DNS to discover the closest CDN optimizer server.
   The agent 202 creates a control connection with the CDN optimizer server 201.
   The CDN optimizer server 201 informs agent 202 that SZ edges are mapped to domain X (no need to detail to the agent the actual edges).
   The agent 202 sets up a deterministic hashing function that maps every URL to the range [0 . . . SZ1].
2. Upon a New HTTPS Request:
   The agent 202 calculates: H=the content name's hash.
   The agent 202 checks if there's already an open HTTPS connection towards the combination DM (domain)+H, and reuses any existing one. If not, the agent 202 opens a new connection and tells the CDN optimizer server 201 (using one of the techniques mentioned above): route this connection to DM/H.
   The CDN optimizer server 201 translates H to the specific edge and routes the connection accordingly.

The expected result is that two different users approaching the same object would land on the same edge and maximize their probability for a cache hit.

3.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
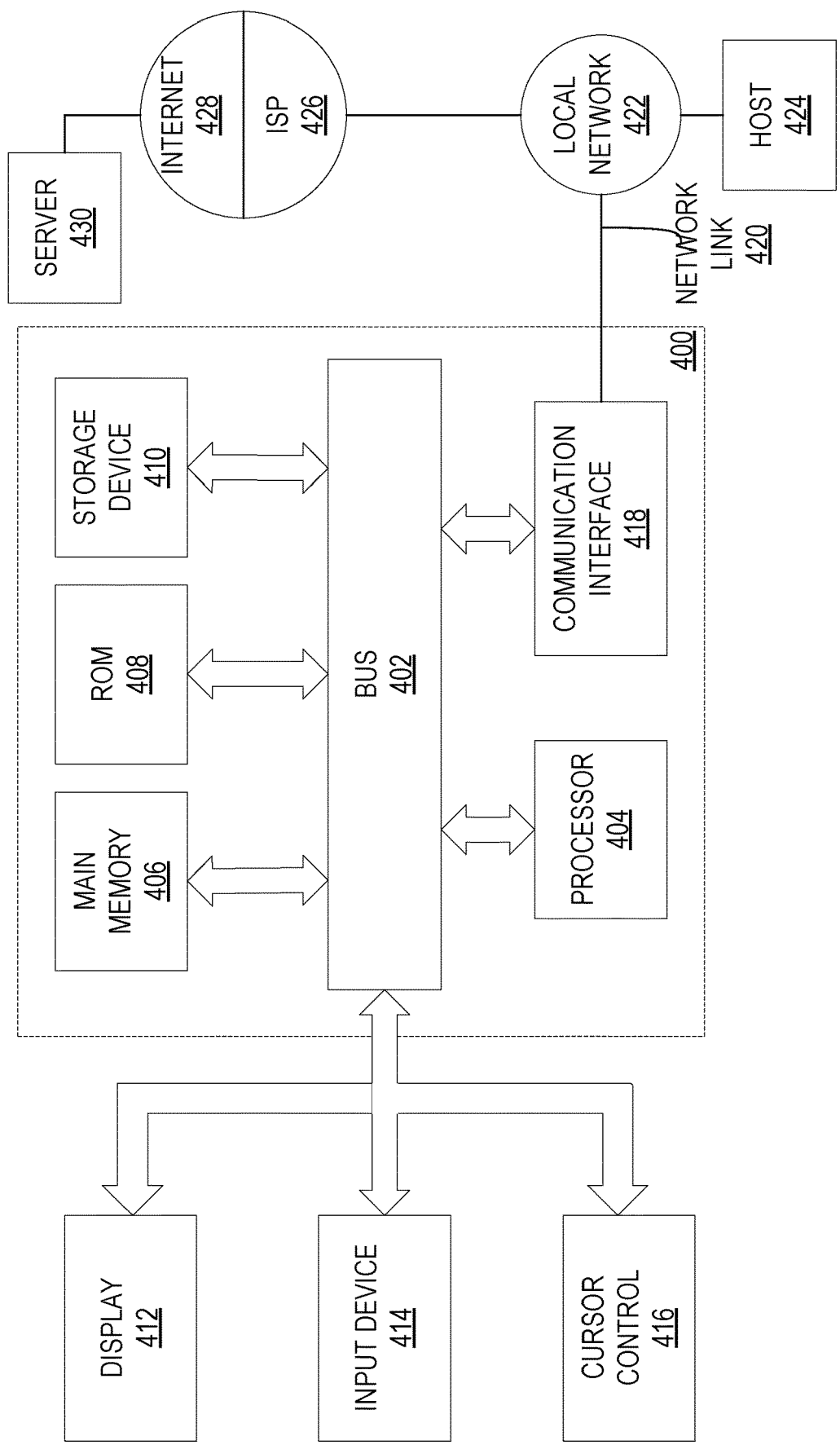
FIG. 4 illustrates an example hardware platform on which a computer or a computing device as described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is device-specific to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using device-specific hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

4.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
receiving, by a server, an out-of-band notification for a domain name and content name from an agent component at a client device, the notification indicating that one or more subsequent requests for the content name from the client device will be routed to the domain name;
in response to receiving the notification, searching a map for the domain name and content name combination, the map includes a plurality of edge server network addresses in a content delivery system and associated domain and content names;
selecting a network address of an edge server for the domain name and content name combination from one or more edge server network addresses associated with the domain name and content name combination in the map; and
sending the selected network address to the agent component at the client device, wherein the agent component routes all network traffic for a particular application program running on the client device to the server, and wherein the server monitors traffic between client devices and edge servers to calculate a caching ratio of the edge servers.

2. The method as recited in claim 1, wherein the map includes latency measurements between the server and edge servers in the map.

3. The method as recited in claim 1, wherein the map includes latency measurements between the server and edge servers in the map, and wherein the selecting the network address of the edge server further comprises:
selecting the edge server from the one or more edge servers associated with the domain name and content name combination based on the latency measurements between the server and edge servers in the map.

4. The method as recited in claim 1, wherein the map includes latency measurements between the server and edge servers in the map, and wherein the selecting the network address of the edge server further comprises:
selecting the edge server by performing load balancing between two or more edge servers associated with the domain name and content name combination.

5. The method as recited in claim 1, wherein the map is preloaded with network addresses of edge servers and associated domain name and content name information.

6. The method as recited in claim 1, wherein the selecting the network address of the edge server further comprises:

selecting the edge server from the one or more edge servers associated with the domain name and content name combination based on a count of a number of times that the edge server network address was returned by a DNS server.

7. The method as recited in claim 1, wherein the content name is a hash value of at least a portion of a URL for a content file; and wherein the hash value and the domain name are used for selecting the edge server from the one or more edge servers associated with the domain name and content name combination.

8. One or more non-transitory computer-readable storage media, storing one or more sequences of instructions, which when executed by one or more processors cause performance of a method, the method comprising:
receiving, by a server, an out-of-band notification for a domain name and content name from an agent component at a client device, the notification indicating that one or more subsequent requests for the content name from the client device will be routed to the domain name;
in response to receiving the notification, searching a map for the domain name and content name combination, the map includes a plurality of edge server network addresses in a content delivery system and associated domain and content names;
selecting a network address of an edge server for the domain name and content name combination from one or more edge server network addresses associated with the domain name and content name combination in the map; and
sending the selected network address to the agent component at the client device, wherein the agent component routes all network traffic for a particular application program running on the client device to the server, and wherein the server monitors traffic between client devices and edge servers to calculate a caching ratio of the edge servers.

9. The one or more non-transitory computer-readable storage media as recited in claim 8, wherein the map includes latency measurements between the server and edge servers in the map.

10. The one or more non-transitory computer-readable storage media as recited in claim 8, wherein the map includes latency measurements between the server and edge servers in the map, and wherein the selecting the network address of the edge server further comprises:
selecting the edge server from the one or more edge servers associated with the domain name and content name combination based on the latency measurements between the server and edge servers in the map.

11. The one or more non-transitory computer-readable storage media as recited in claim 8, wherein the map includes latency measurements between the server and edge servers in the map, and wherein the selecting the network address of the edge server further comprises:
selecting the edge server by performing load balancing between two or more edge servers associated with the domain name and content name combination.

12. A system comprising:
a route request receiver, implemented at least partially in hardware at a server, configured to receive an out-of-band notification for a domain name and content name from an agent component at a client device, the notification indicating that one or more subsequent requests for the content name from the client device will be routed to the domain name;
an edge server selector, implemented at least partially in hardware at the server, configured to, in response to receiving the notification, searching a map for the domain name and content name combination, the map includes a plurality of edge server network addresses in a content delivery system and associated domain and content names;
wherein the edge server selector selects a network address of an edge server for the domain name and content name combination from one or more edge server network addresses associated with the domain name and content name combination in the map; and
an agent interface, implemented at least partially in hardware at the server, configured to send the selected network address to the agent component at the client device;
wherein the agent component routes all network traffic for a particular application program running on the client device to the server; wherein the server monitors traffic between client devices and edge servers to calculate a caching ratio of the edge servers.

13. The system as recited in claim 12, wherein the map includes latency measurements between the server and edge servers in the map.

14. The system as recited in claim 12, wherein the map includes latency measurements between the server and edge servers in the map, and wherein the edge server selector is further configured to select the edge server from the one or more edge servers associated with the domain name and content name combination based on the latency measurements between the server and edge servers in the map.

15. The system as recited in claim 12, wherein the map includes latency measurements between the server and edge servers in the map, and wherein the edge server selector is further configured to select the edge server by performing load balancing between two or more edge servers associated with the domain name and content name combination.

* * * * *